United States Patent
Bruya et al.

(10) Patent No.: US 11,651,115 B2
(45) Date of Patent: May 16, 2023

(54) PREFABRICATED BUILDING COMPONENTS BASED ON MUNICIPAL AND COUNTY CODES

(71) Applicant: Prefabricated Building Components, LLC, Spokane, WA (US)

(72) Inventors: Edward Joseph Bruya, Spokane, WA (US); Michael Ryan Bradley, Spokane, WA (US)

(73) Assignee: Prefabricated Building Components, LLC, Spokane, WA (US)

( * ) Notice: Subject to any disclaimer, the term of this patent is extended or adjusted under 35 U.S.C. 154(b) by 414 days.

(21) Appl. No.: 16/277,673

(22) Filed: Feb. 15, 2019

(65) Prior Publication Data
US 2020/0265120 A1    Aug. 20, 2020

(51) Int. Cl.
G06F 30/13    (2020.01)
E04B 1/74     (2006.01)
E04C 2/24     (2006.01)

(52) U.S. Cl.
CPC ............... *G06F 30/13* (2020.01); *E04B 1/74* (2013.01); *E04C 2/24* (2013.01)

(58) Field of Classification Search
CPC ............... G06F 30/13; E04C 2/24; E04B 1/74
See application file for complete search history.

(56) References Cited

U.S. PATENT DOCUMENTS

2006/0075718 A1*   4/2006   Borne .................. G06Q 10/06
                                                        52/745.02

OTHER PUBLICATIONS

Ferrandino, Alessandra. "A Pre-processor for Numerical Analysis of Cross-Laminated Timber Structures." (2015).*

* cited by examiner

*Primary Examiner* — Saif A Alhija
(74) *Attorney, Agent, or Firm* — FIG. 1 Patents

(57) ABSTRACT

In implementations of prefabricated building components based on municipal and county codes, a housing design requirement describing a limitation on a dimension of a housing feature is identified. A housing design of a house is generated to comply with the identified limitation on the dimension, and the housing design is configured to be manufactured using a prefabricated component. The housing design is refined by adjusting design dimensions based on stock dimensions of subcomponents of the prefabricated component, and a refined housing design is generated based on the adjustments to the design dimensions.

20 Claims, 8 Drawing Sheets

300

302
Identify a housing design requirement from a housing code, the housing design requirement describing a limitation on a dimension of a housing feature and at least one additional housing feature that is excluded from a calculation of the limitation on the dimension

304
Generate a housing design of a house configured to be manufactured using at least one prefabricated component, the housing design complying with the limitation on the dimension of the housing feature wherein the housing design includes the at least one additional feature that is excluded from the calculation of the limitation on the dimension

306
Refine the housing design by adjusting design dimensions based on stock dimensions of subcomponents of the at least one prefabricated component

308
Generate a refined housing design of the house based on the adjusting, the refined housing design including the at least one prefabricated component

*Fig. 3*

PREFABRICATED BUILDING COMPONENTS BASED ON MUNICIPAL AND COUNTY CODES

BACKGROUND

It is generally desirable in the housing construction industry to minimize onsite construction by using prefabricated components. Offsite construction is preferable to onsite construction according to multiple objective metrics. For example, a home may be constructed using prefabricated components in a fraction of the time that the same home could be constructed by onsite construction alone. However, the benefits of offsite construction are not so limited, e.g., use of prefabricated components can greatly increase confidence in a housing design by ensuring that any potential design flaws are discovered and corrected before widespread implementation of any particular design. Additionally, using prefabricated building components reduces construction problems related to inclement weather and requires less skilled labor than purely onsite construction.

Conventional techniques for prefabricated construction suffer from several disadvantages. For example, individual components of a prefabricated building are more expensive than raw materials because the costs of prefabricated components include engineering and design costs as well as machining and tooling costs. As a result, the economic advantage of using prefabricated components in construction can be lost if the construction requires even a small amount of onsite modification of the prefabricated components.

SUMMARY

Systems and techniques are described for prefabricated building components based on municipal and county codes. A housing design requirement is identified from a housing code and the housing design requirement describes a limitation on a dimension of a housing feature. The housing feature may be a footprint or a floor area and the limitation can be either a maximum size or a minimum size or a range of sizes. A housing design is generated to comply with the identified limitation and the housing design is configured to be built using prefabricated components.

The housing design is refined by adjusting design dimensions based on stock dimensions of subcomponents of the prefabricated components. These adjustments can include making slight changes in the design dimensions to more efficiently use materials by minimizing scrapped and wasted material. The adjustments can also include adjusting the dimensions of the subcomponents to reduce scrapped material, such as by selecting subcomponents having different stock dimensions. For example, adjustments may also be based on dimensions or other features of easily manufactured subcomponents. In one example, adjustments can be made based on dimensions or other features of subcomponents that may be transported through standard shipping channels. In another example, adjustments may be made based on dimensions or other features of subcomponents that can be assembled onsite. A refined housing design is then generated based on these adjustments.

The systems and techniques described herein provide several improvements relative to conventional housing design and manufacturing. For example, by minimizing wasted material, these techniques reduce overall costs associated with building a home. Use of prefabricated components, and in particular, using multiple versions of the same prefabricated component design in the refined housing design enables larger scale production of the prefabricated components which further reduces cost and helps ensure consistency of homes built using the prefabricated components. Maximizing offsite construction reduces the amount of skilled labor necessary to complete a building project and reduces the likelihood of many issues associated with purely onsite construction such as weather, onsite storage of raw materials, etc. Use of many prefabricated components in construction allows for multiple houses to be built according to the principals of lean manufacturing, just-in-time manufacturing, etc. Additionally, offsite construction of prefabricated components allows for housing projects to be completed in a significantly reduced timeframe compared to conventional onsite construction.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a refined housing design of a house is generated by adjusting design dimensions.

DETAILED DESCRIPTION

Overview

Figure 1:
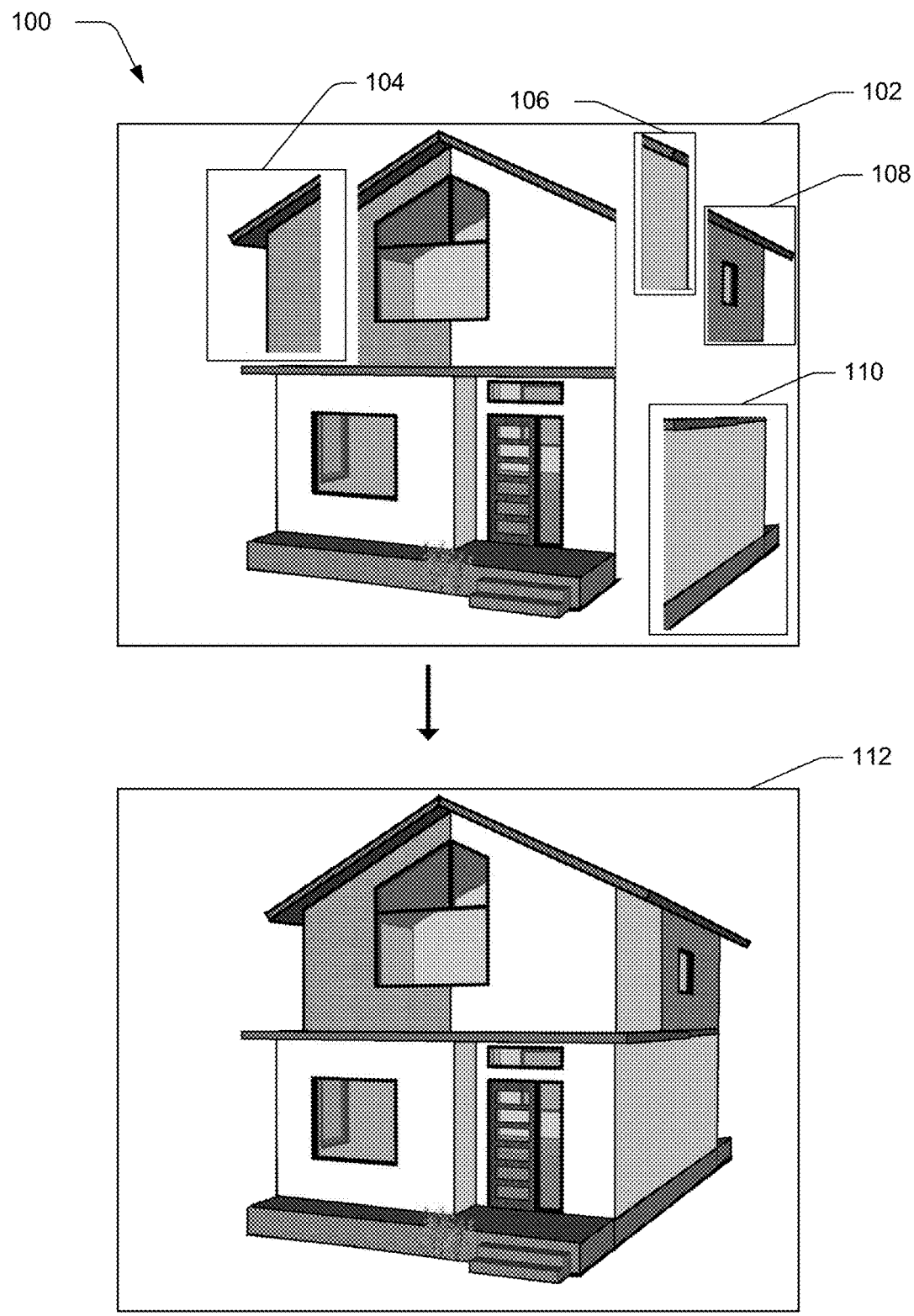
FIG. 1 is an example illustration of a representation of construction using prefabricated components.

It is desirable in the housing construction industry to minimize onsite construction by maximizing offsite construction such as by constructing houses using prefabricated components. Offsite construction is preferable to onsite construction in many ways. For example, a home can be constructed using prefabricated components in a fraction of the time that the same home can be constructed by onsite construction alone. Moreover, the use of prefabricated components can greatly increase confidence in a housing design by ensuring that any potential design flaws are discovered and corrected before widespread implementation of any particular design. Additionally, using prefabricated building components reduces construction problems related to inclement weather and requires less skilled labor than conventional onsite construction.

Conventional techniques for prefabricated construction suffer from several disadvantages. For example, individual components of a prefabricated building are more expensive than raw materials because the prefabricated components include engineering and design costs as well as machining and tooling costs. As a result, the economic advantage of using prefabricated components in construction can be lost if the construction requires even a small amount of onsite modification of the prefabricated components.

Systems and techniques are described for prefabricated building components based on municipal and county codes. A housing design requirement is identified from a housing code and the housing design requirement describes a limitation on a dimension of a housing feature. For example, the housing feature may be a footprint or a floor area and the limitation can be either a maximum size or a minimum size or a range of sizes. A housing design is generated to comply with the identified limitation and the housing design is configured to be built using prefabricated components.

The housing design is refined by adjusting design dimensions based on stock dimensions of subcomponents of the prefabricated components. For example, the subcomponents can be cross laminated timber panels, structural insulated panels, walls, etc. The adjustments to the design dimensions can include making slight changes in the design dimensions to more efficiently use materials by minimizing scrapped and wasted material. These adjustments can also include adjusting the dimensions of the subcomponents to reduce scrapped material, such as by selecting subcomponents having different stock dimensions. For example, adjustments may also be based on dimensions or other features of easily manufactured subcomponents. In one example, adjustments can be made based on dimensions or other features of subcomponents that may be transported through standard shipping channels. In another example, adjustments may be made based on dimensions or other features of subcomponents that can be assembled onsite. A refined housing design is then generated based on these adjustments. This refined design is a modular design including multiple prefabricated subcomponents. In this way, the economy of construction is maximized.

The systems and techniques described herein provide several improvements relative to conventional housing design and onsite manufacturing. In one example, minimizing wasted material reduces overall costs associated with building a home. Specifically, the use of multiple versions of the same prefabricated component in the refined housing design enables larger scale production of the prefabricated components which further reduces cost and helps ensure consistency of the homes built using the prefabricated components. By applying the techniques described herein, it is possible to provide multiple housing model iterations such that a few standard changes to a housing model can maximize visual differentiation between the housing model and other housing models which contributes a sense of uniqueness to the housing model while at the same time using standard prefabricated components to minimize costs associated with building the housing model.

Further, maximizing offsite construction reduces the amount of skilled labor necessary to complete a building project, and reduces the likelihood of many issues associated with onsite construction such as inclement weather, onsite storage of raw materials, labor shortages, etc. Use of many prefabricated components in construction allows for multiple houses to be built according to the principals of lean manufacturing, just-in-time manufacturing, etc. Additionally, offsite construction of prefabricated components allows for housing projects to be completed in a significantly reduced timeframe compared to conventional onsite construction.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Representations

FIG. 1 is an example illustration of a representation 100 of construction using prefabricated components. The representation 100 includes a partially constructed house 102 that is being constructed using prefabricated components 104-110. As shown in FIG. 1, prefabricated components 104-110 are combined to form a fully constructed house 112. The advantages of using prefabricated components 104-110 to build the constructed house 112 can be appreciated from a practical example. Consider an example in which a builder is constructing multiple houses for a housing construction project and some of these multiple houses are identical in design. The houses that share a common design in this example may be built using identical prefabricated components 104-110.

Furthermore, consider prefabricated component 104 which must be manufactured, inspected, and shipped to a construction site before a trained professional can include the prefabricated component 104 in the constructed house 112. In one example, prefabricated component 104 may be manufactured using machining such as computer numerical control machining. The cost to manufacture an article using machining includes a setup cost and a material cost. The setup cost is often significant relative to the material cost but it is generally a one-time cost that reflects a machinist's time in programming and/or preparing the machine to manufacture the prefabricated component 104. By using the prefabricated component 104 to build multiple constructed houses 112, the setup cost can be spread over many prefabricated components 104 which reduces the cost per prefabricated component.

The material cost refers to the cost of the raw material that is machined to manufacture the prefabricated component 104. Material is typically only available in stock form such as rod stock and purchases of material are also typically subject to a minimum purchase quantity. The reason that vendors impose minimum purchase quantities is because the cost to ship the material is often substantial and invariable to the quantity of material shipped. For example, it may cost a vendor of stock material the same amount to ship one piece of stock material as to ship 10 pieces of the same stock material. Further, the cost to ship the one piece of stock material can be greater than the sale price of the one piece of stock material. In this example, a vendor may be motivated to require a minimum purchase quantity of 10 pieces of stock material. Because of such minimum purchase requirements, it is more cost effective to manufacture many prefabricated components 104 than to manufacture only a few prefabricated components.

Consider further that, in many if not most scenarios, a single piece of stock material may be used to manufacture multiple prefabricated components 104. Assume, for example, that each piece of stock material can be manufactured into five prefabricated components 104. Assume further that the builder may only need two prefabricated components 104, e.g., to build two constructed houses 112. However, to manufacture the two needed prefabricated components 104, the builder would have incurred the setup cost and the cost of one piece of stock material just to manufacture the two prefabricated components 104. Once these costs are incurred, the incremental cost to manufacture three additional prefabricated components 104 is almost insignificant. Therefore, the cost to the builder to manufacture five prefabricated components 104 is about the same as the cost to manufacture the two needed prefabricated components. In other words, the builder can benefit from multiple economies of scale by manufacturing many prefabricated components 104 as compared to manufacturing few prefabricated components 104.

After the prefabricated component 104 is manufactured, it must be inspected for conformance to its design before the component 104 can be used to build the constructed house 112. Inspection criteria vary widely by article type and particularly by an intended use of an article. For example, inspection criteria for a medical device may be critical to ensure that a physician and/or patient is not at risk of serious injury or death while using the medical device as intended. In another example on the opposite end of the criticality spectrum, inspection criteria for a paperweight may be significantly less critical and this paperweight may only be inspected to a single criterion as its name suggests, e.g., the inspection criterion may be as simple as checking the weight of a paperweight. Accordingly, there are many types of inspection processes, such as attribute inspection which considers discrete data like a number of non-conformities, and variable inspection which measures continuous data, for example, time, velocity, etc.

For use in a construction applications, the prefabricated component 104 must meet all universal building code requirements, such as uniform building code requirements, as well as specific adaptions and clarifications of the local authority having jurisdiction. The local authority having jurisdiction may be a city government, a county government, a state government, a federal government, a tribal authority, a school district, a university campus, etc. Additionally, an inspector or multiple inspectors for the authority having jurisdiction may have different interpretations of the various requirements. Regardless of the manner of inspection of the prefabricated component 104, the cost to inspect each prefabricated component 104 generally decreases as the number of prefabricated components being inspected increases. Moreover, large quantities of prefabricated components 104 may be inspected according to an acceptable quality limit.

The acceptable quality limit inspection relies on statistics to enable a portion or a sample of an entire amount of articles to be inspected to determine whether the entire amount of articles passes or does not pass inspection. The size of the sample necessary to inspect an entire batch or lot of articles depends on the total number of articles in the lot and an acceptance quality limit. The acceptance quality limit is typically expressed as a percentage and it describes how many articles of the sample can fail inspection acceptably. For example, an inspection at an acceptance quality limit of one percent would statistically allow up to one percent of the articles being inspected to pass inspection even though the one percent of the passed articles should not have passed inspection.

Consider the five prefabricated components 104 that could be manufactured from the single piece of stock material from the previous example. In this context, the lot size is five; however, only two of the five samples would need to be inspected to either pass or fail all five of the samples. Consider another example where 50 prefabricated components 104 are manufactured and need to be inspected before being used to build the constructed house 112. In this example, only five of the 50 prefabricated components 104 must be inspected to determine whether all 50 components pass or whether all 50 components fail according to the acceptance quality limit inspection. As these two examples illustrate, the cost to inspect each prefabricated component 104 generally decreases as the number of prefabricated components 104 being inspected increases.

Assuming that the prefabricated components 104 pass inspection and are deemed acceptable for use, the components still need to be shipped through standard shipping channels to a construction site before being included as part of the constructed house 112. For reasons similar to the reasons many raw material vendors require minimum purchase quantities of stock material based on shipping costs, the cost to ship each prefabricated component 104 generally decreases as the number of prefabricated components being shipped increases. In other words, it may often cost the same amount to ship one prefabricated component 104 to the construction site as to ship five prefabricated components 104 to the construction site. By using the prefabricated component 104 to build multiple constructed houses 112, the cost to ship each prefabricated component can be significantly decreased.

Further advantages of using a single prefabricated component to build multiple constructed houses 112 include a reduction in labor costs such as the costs of training and costs of tooling. Consider another example in which a particular professional is trained to include the prefabricated component 110 in the constructed house 112. Further, assume that the particular professional requires a first set of tools or installation equipment to include the prefabricated component 110 in the constructed house 112. If the particular professional has the training and equipment necessary to include one prefabricated component 110 in one constructed house 112, then the particular professional likely has the ability to include many prefabricated components 110 in many constructed houses 112. In this way, use of many prefabricated components 110 allows for multiple constructed houses 112 to be built according to the principals of lean manufacturing, just-in-time manufacturing, etc.

Figure 2:
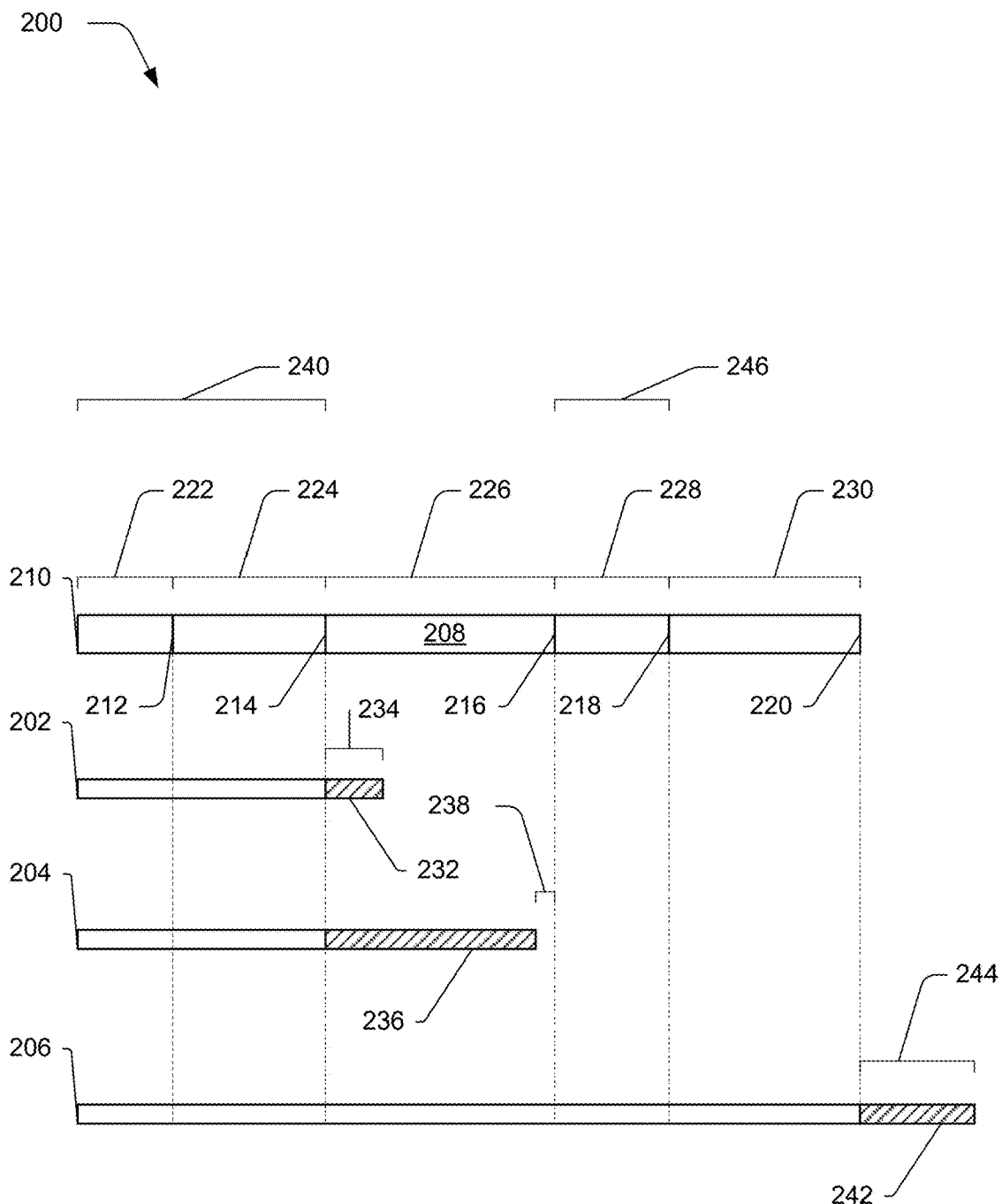
FIG. 2 is an illustration of a representation of adjusting design dimensions based on stock dimensions of subcomponents of a prefabricated component.

FIG. 2 is an illustration of a representation 200 of adjusting design dimensions based on stock dimensions of subcomponents of a prefabricated component. The representation 200 includes a first subcomponent 202 having a first stock dimension, a second subcomponent 204 having a second stock dimension, and a third subcomponents 206 having a third stock dimension. As shown in FIG. 2, the representation 200 also includes a design consideration 208 which is illustrated to include a start point 210 and cut points 212-220. As illustrated, the cut points 212-220 define use portions 222-230. In this example, a relative position of cut points 212-220 along the design consideration 208 may be slightly adjusted to adjust a length of the use portions 222-230. For example, subcomponents 202-206 may represent a common material available in three different stock dimensions such as a stock material available in three different stock lengths.

In one example, the subcomponents 202-206 may represent cross laminated timber panels available in three different stock panel lengths, and a length of each cross laminated timber panel must extend fully to one of the cut points 212-220 to be usable in one of the use portions 222-230 of the design consideration 208. In another example, the subcomponents 202-206 may represent structural insulated panels available in three different stock panel lengths such that a length of each structural insulated panel must fully extend to one of the cut points 212 to be used in one of the use portions 222-230. The subcomponent 202-206 may also represent prefabricated walls available in three different stock lengths or any other construction element available in units or pieces having stock dimensions.

As shown in FIG. 2, the first subcomponent 202 extends from the start point 210 past cut points 212 and 214 but does not fully extend to cut point 216, and as a result, a first extra portion 232 of the first subcomponent may be scrap or wasted material. To determine whether the first extra portion 232 is scrap, a length 234 of the first extra portion 232 is compared to the use portions 222-230 to determine if the length 234 is long enough to be used in any of the use portions 222-230. In this example, the length 234 is less than the length of the shortest use portion 222 so the first extra portion 232 may not be used in any of the use portions 222-230. Additionally, a remaining distance to the next cut point 216 is considered to determine if a slight adjustment of the cut points 212-220 may adjust the use portions 222-230 such that the first extra portion 232 may be used in the design consideration 208. In this example, no such slight adjustment is feasible and the first extra portion 232 is wasted material or scrap.

The second subcomponent 204 also extends past cut points 212 and 214, and the second subcomponent also does not fully extend to cut point 216. This creates a second extra portion 236 which may be wasted material. Again, to determine whether the second extra portion 236 is scrap, the second extra portion is compared to the use portions 222-230 but the second extra portion 236 may not be used in any of the use portions 222-230. However, in this example, a remaining distance 238 to the next cut point 216 is relatively small and an adjustable distance 240 can be decreased by the remaining distance 238. Once adjusted, the second subcomponent 204 will fully extend to the cut point 216 and the second extra portion 236 can be used in use portion 226. In other words, the adjustable distance 240 can be adjusted by decreasing use portion 222 by the remaining distance 238, by decreasing use portion 224 by the remaining distance, or by decreasing both use portion 222 and use portion 224 by a portion of the remaining distance 238. In this way, the second extra portion 236 is not scrap or wasted material but instead is usable in use portion 226.

As shown in FIG. 2, the third subcomponent 206 extends from the start point 210 past all of the cut points 212-220 creating a third extra portion 242 which may be scrap or wasted material. To determine whether the third extra portion 242 is scrap, the third extra portion 242 is compared to each of the use portions 222-230. In this example, a length 244 of the third extra portion 242 is the same as a length 246 of use portion 228, and the third extra portion 242 can be used in use portion 228. It should be appreciated that the third extra portion 242 is not needed for the design consideration 208 because another portion of the third subcomponent 206 is already used in use portion 228 in this example. However, the third extra portion 246 can be used in a use portion 228 of an identical design consideration 208. Therefore, in this example, the third extra portion 242 is not scrap or wasted material.

In general, functionality, features, and concepts described in relation to the examples above and below may be employed in the context of the examples described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedure

The following discussion describes techniques that may be implemented utilizing the concepts described herein. The procedures are shown as a set of blocks that specify operations and are not necessarily limited to the orders shown for performing the operations by the respective blocks. In portions of the following discussion, reference may be made to FIG. 1 and/or FIG. 2.

FIG. 3 is a flow diagram depicting a procedure 300 in an example implementation in which a refined housing design of a house is generated by adjusting design dimensions. A housing design requirement is identified from a housing code (block 302), the housing design requirement describing a limitation on a dimension of a housing feature and at least one additional housing feature that is excluded from a calculation of the limitation on the dimension. The housing code may include all universal building code requirements, such as uniform building code requirements, as well as specific adaptions and clarifications of the local authority having jurisdiction. The local authority having jurisdiction may be a city government, a county government, a state government, a federal government, a tribal authority, a school district, a university campus, etc. Additionally, an inspector or multiple inspectors for the authority having jurisdiction may have different interpretations of the various requirements and the housing code may also include these interpretations.

For example, a municipal or county housing code may describe limitations on dimensions of a housing feature of cottage housing such as a maximum floor area, a minimum floor area, a maximum footprint, a minimum footprint, a maximum wall height, a minimum wall height, a maximum roof height, a minimum roof height, a maximum open space, a minimum open space, a maximum private space, a minimum private space, a maximum distance between structures, a minimum distance between structures, a maximum number of parking spaces, a minimum number of parking spaces, etc. A housing code may also describe housing features that are excluded from a calculation of a floor area such as bay windows, fireplaces, utility closets, stairways, storage areas, etc.

A housing design of a house configured to be manufactured using at least one prefabricated component is generated (block 304), the housing design complying with the limitation on the dimension of the housing feature wherein the housing design includes the at least one additional feature that is excluded from the calculation of the limitation on the dimension. The housing design is refined by adjusting design dimensions based on stock dimensions of subcomponents of the at least one prefabricated component (block 306). For example, the adjustable distance 240 of a housing feature may be adjusted such that the second extra portion 236 is not scrap or wasted material but instead is usable in one or more of the use portions 222-230. The adjustments to design dimensions may be made based on other considerations beyond stock dimensions of a subcomponent. For example, adjustments may also be based on dimensions or other features of easily manufactured subcomponents. In one example, adjustments can be made based on dimensions or other features of subcomponents that may be transported through standard shipping channels. In another example, adjustments may be made based on dimensions or other features of subcomponents that can be assembled onsite. In some instances, these adjustments may be made on considerations such as minimum purchase quantities, etc. A refined housing design of the house is generated based on the adjusting (block 308), the refined housing design including the at least one prefabricated component.

Prefabricated Building Components Based on Municipal and County Codes

Figure 4:
FIG. 4 is an illustration of a representation of a refined floor design.

FIG. 4 is an illustration of a representation 400 of a refined floor design. The representation 400 is illustrated to include a floor layout 402. For example, the floor layout 402 may be designed based on a limitation on a dimension of a housing feature as defined by a municipal or county housing code, e.g., the floor layout 402 may be designed to comply with a maximum floor area or a footprint defined by the municipal or county housing code. In one example, the floor layout 402 can be generated by iteratively adjusting design dimensions based on stock lengths of subcomponents 202-206 as previously described. Through this iterative process, scrap or wasted material is minimized by adjusting design dimensions to efficiently utilize stock lengths of the subcomponents and/or identifying various techniques to prevent first extra portion 232, second extra portion 236, and third extra portion 242 from being scrapped as wasted material. It should be appreciated that these techniques are not limited to adjusting design dimensions based on stock lengths of subcomponents 202-206, and floor layout 402 illustrates an example in which lengths of subcomponents 202-206 other than stock lengths may be considered in design iterations to improve efficiency of material use.

As shown in FIG. 4, the floor layout 402 includes subcomponents 404-416. In this example, floor layout 402 may be completely constructed from only seven different designs of the subcomponents 404-416. For example and with reference to FIG. 4, the floor layout 402 may be constructed using eight identical subcomponents 404, eight identical subcomponents 406, eight identical subcomponents 408, four identical subcomponents 410, eight identical subcomponents 412, four identical subcomponents 414, and eight identical subcomponents 416. By applying the described techniques to generate the floor plan 402, and by using the same floor plan 402 multiple times in many constructed houses 112, the benefits of these techniques enable construction of all of the floor plans 402 of the many constructed houses 112 using only seven different designs of subcomponents 404-416 in this example.

Figure 5:
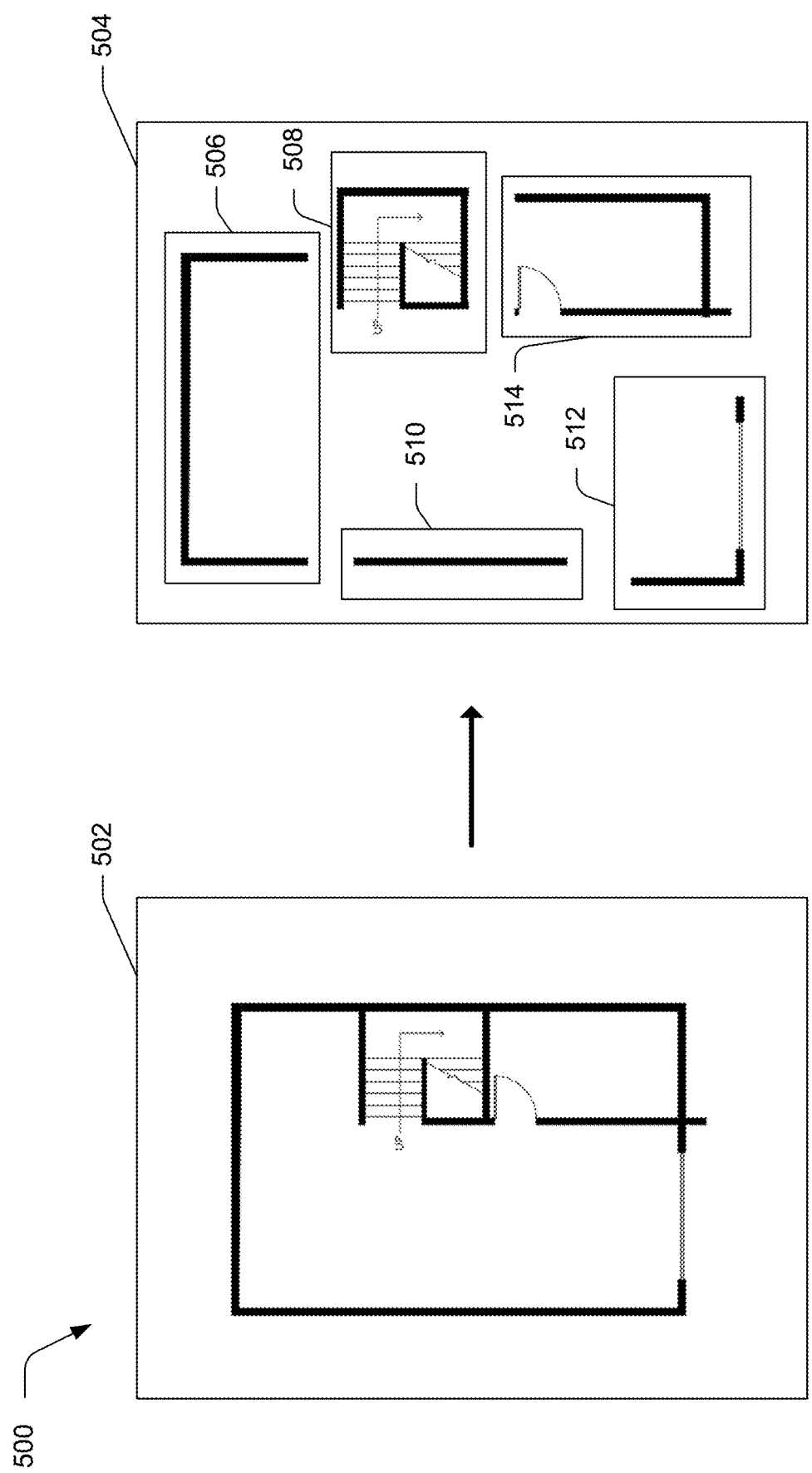
FIG. 5 is an illustration of a representation of generation of prefabricated components from a refined housing design.

FIG. 5 is an illustration of a representation 500 of generation of prefabricated components from a refined housing design. The representation 500 is illustrated to include a refined floor plan design 502. For example, the refined floor plan design 502 may be generated using the previously described techniques to maximize efficiency of material use by minimizing scrap or wasted material. In another example, the refined floor plan design 502 may guide generation of a set of prefabricated components 504. In this manner, a floor plan design may be generated based on a housing design requirement from a housing code describing a limitation on a dimension of a housing feature. This floor plan design may then be refined to generate the refined floor plan design 502 which may then guide generation of the set of prefabricated components 504 that can be assembled to construct the refined floor plan design 502, e.g., as part of building constructed housing 112.

In this example, the set of prefabricated components 504 includes prefabricated components 506-514. In other examples, the set of prefabricated components 504 can include additional prefabricated components, different prefabricated components, or fewer prefabricated components. In one example, the set of prefabricated components 504 may include only a single prefabricated component. In the illustrated example, the prefabricated components 506-514 may be generated according to shipping considerations. For example, the prefabricated components 506-514 may be designed to be disposed in a particular shipping container or designed to be disposed in a particular shipping vehicle. In another example, the prefabricated components 506-514 may be designed based on generic shipping considerations. Consider an example in which prefabricated component 510 is rotated 90 degrees to fit within prefabricated component 506. For example, prefabricated component 514 may also be rotated 90 degrees to also fit within prefabricated component 506. In this way, prefabricated components 506, 510, and 514 may all be shipped in a container, vehicle, or aircraft having a collective footprint the size of prefabricated component 506. Similarly, prefabricated component 508 may be designed to fit within prefabricated component 512. In another example, the prefabricated components 506-514 may be generated according to other considerations such as connection points, material types, order of assembly, etc. For example, the set of prefabricated components 504 may be designed based on a limitation on a dimension of a housing feature as defined by a municipal or county housing code, e.g., the set of prefabricated components 504 may be designed to comply with a maximum floor area or a footprint defined by the municipal or county housing code.

Figure 6:
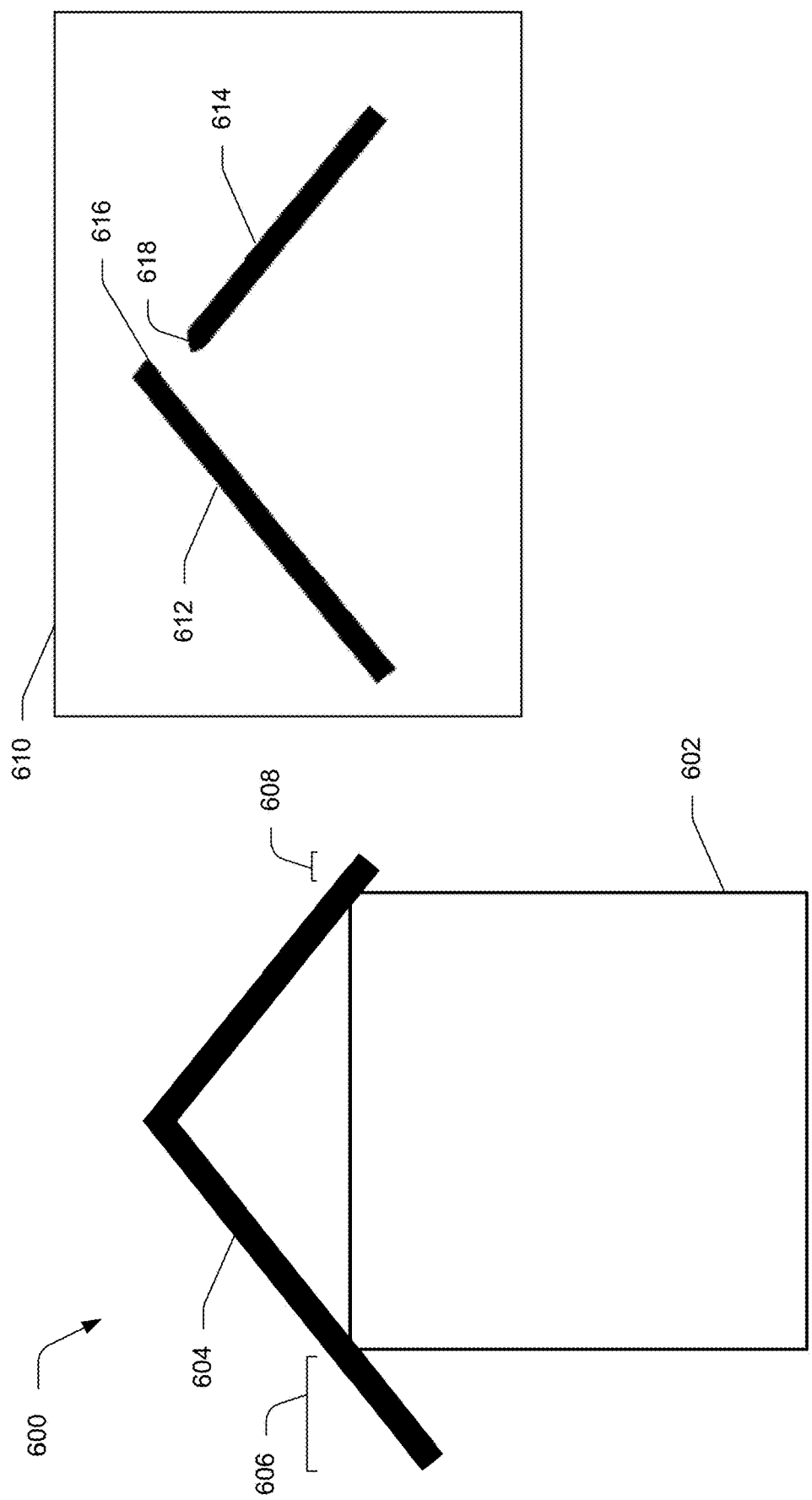
FIG. 6 is an illustration of a representation of generation of prefabricated components for a roof.

FIG. 6 is an illustration of a representation 600 of generation of prefabricated components for a roof. The representation includes a house having a base 602 and a constructed roof 604. As shown in FIG. 6, the constructed roof 604 extends a first distance 606 out from the base 602 on one side of the base 602 and the constructed roof 604 extends a second distance 608 out from the base 602 on another side of the base 602. In one example, the first distance 606 may be equal to the second distance 608. In another example, the first distance 606 may not be equal to the second distance 608, e.g., the first distance 606 may be greater than the second distance 608. It should be appreciated that the first distance 606 can be less than the second distance 608 as well.

As illustrated in FIG. 6, the representation 600 also includes a set of prefabricated roof components 610. The set of prefabricated roof components 610 includes a first prefabricated roof component 612 and a second prefabricated roof component 614. The first prefabricated roof component 612 includes a chamfer 616 and the second prefabricated roof component 614 also includes a chamfer 618. Chamfers 616 and 618 are designed to connect when the first prefabricated roof component 612 and the second prefabricated roof component 614 are assembled as the constructed roof 604. In one example, the set of prefabricated roof components 610 may be designed based on a limitation on a dimension of a housing feature as defined by a municipal or county housing code, e.g., the set of prefabricated roof components 610 may be designed to comply with a minimum roof slope or a maximum house height defined by the municipal or county housing code. For example, the municipal or county housing code may limit a height of a pitched roof as being 30 feet or less from grade and a height of a flat roof as being 20 feet or less from the grade.

Figure 7:
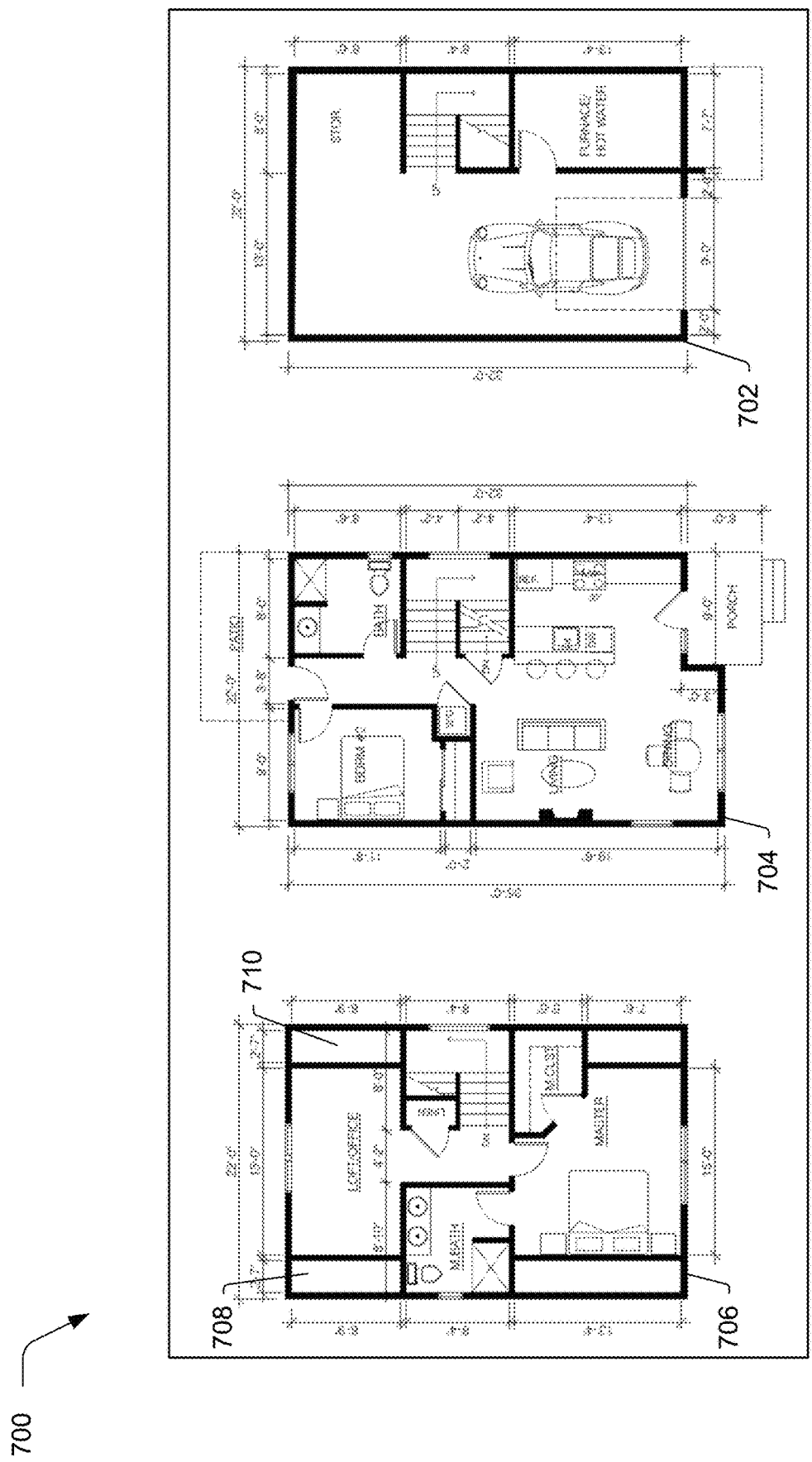
FIG. 7 illustrates an example floor plan for constructing a house using prefabricated building components based on municipal and county codes.

FIG. 7 illustrates an example floor plan 700 for constructing a house using prefabricated building components based on municipal and county codes. For example, the floor plan 700 may be designed based on a limitation on a dimension of a housing feature as defined by a municipal or county housing code, e.g., the floor plan 700 may be designed to comply with a maximum floor area or a footprint defined by the municipal or county housing code. In one example, the municipal or county housing code may limit a size of a footprint of a house to be no more than 1000 square feet. In another example, the municipal or county housing code may limit a total living space or a total floor space of a house as being no more than 1200 square feet. For example, the municipal or county housing code may define an upper and a lower limit for a total living space or a total floor space as being within a range of 1000 to 1400 square feet.

The floor plan 700 is illustrated to include a lower level 702, a main level 704, and an upper level 706. In one example, the main level 704 may have a footprint as defined in a municipal or county housing code, e.g., the main level 704 may have a footprint as defined in a cottage housing code. For example, the main level 704 may have a footprint in a range of 500 to 1000 square feet, e.g., the main level 704 can have a footprint of 704 square feet. In another example, the main level 704 may have a footprint of less than 500 square feet or greater than 1000 square feet. The lower level 702 may have no features included in a maximum floor area as defined by the municipal or county housing code, e.g., the lower level 702 may be excluded from a calculation of the maximum floor area.

Exclusion from the maximum floor area may be based on the presence or absence of various housing features as described in a municipal or county housing code. By way of example, a jurisdiction's municipal or county housing code may specify that a level or room of a cottage house without any windows (e.g., egress windows) is excluded from a floor space calculation. To this extent, if the lower level 702 has no windows, then its square feet are excluded from a floor area computation—for determining compliance with the municipal or county housing code's maximum floor area limitation. In one example, housing features 708 and 710 may also be excluded from the floor area calculation as features 708 and 710 are built-in storage areas. In one or more implementations, other housing features may be excluded from the maximum floor area calculation such as stairwells or other features generally excluded from such a calculation.

The main level 704 may include portions of the maximum floor area, e.g., the main level 704 may have an area in a range of 400 to 800 square feet that is included in the calculation of the maximum floor area as defined in the municipal or county housing code. In one example, the main level 704 may have an area of 687 square feet that is included in the calculation of the maximum floor area. In another example, the main level 704 may have an area of less than 400 square feet or greater than 800 square feet that is included in the calculation of the maximum floor area. The upper level 706 may have an area in a range of 300 to 700 square feet that is included in the calculation of the maximum floor area as defined in the municipal or county housing code, e.g., the upper level 706 may have an area of 480 square feet that is included in the calculation of the maximum floor area. For example, the upper level 706 may have an area of less than 300 square feet or greater than 700 square feet that is included in the calculation of the maximum floor area.

The main level 704 and the upper level 706 may have a combined area that is included in the calculation of the maximum floor area in a range of 800 to 1200 square feet, e.g., the main level 704 and the upper level 706 may have a combined area of 1167 square feet that is included in the calculation of the maximum floor area as defined by the municipal or county housing code. In one example, the main level 704 and the upper level 706 may have a combined area of less than 800 square feet or greater than 1200 square feet that is included in the calculation of the maximum floor area.

Figure 8:
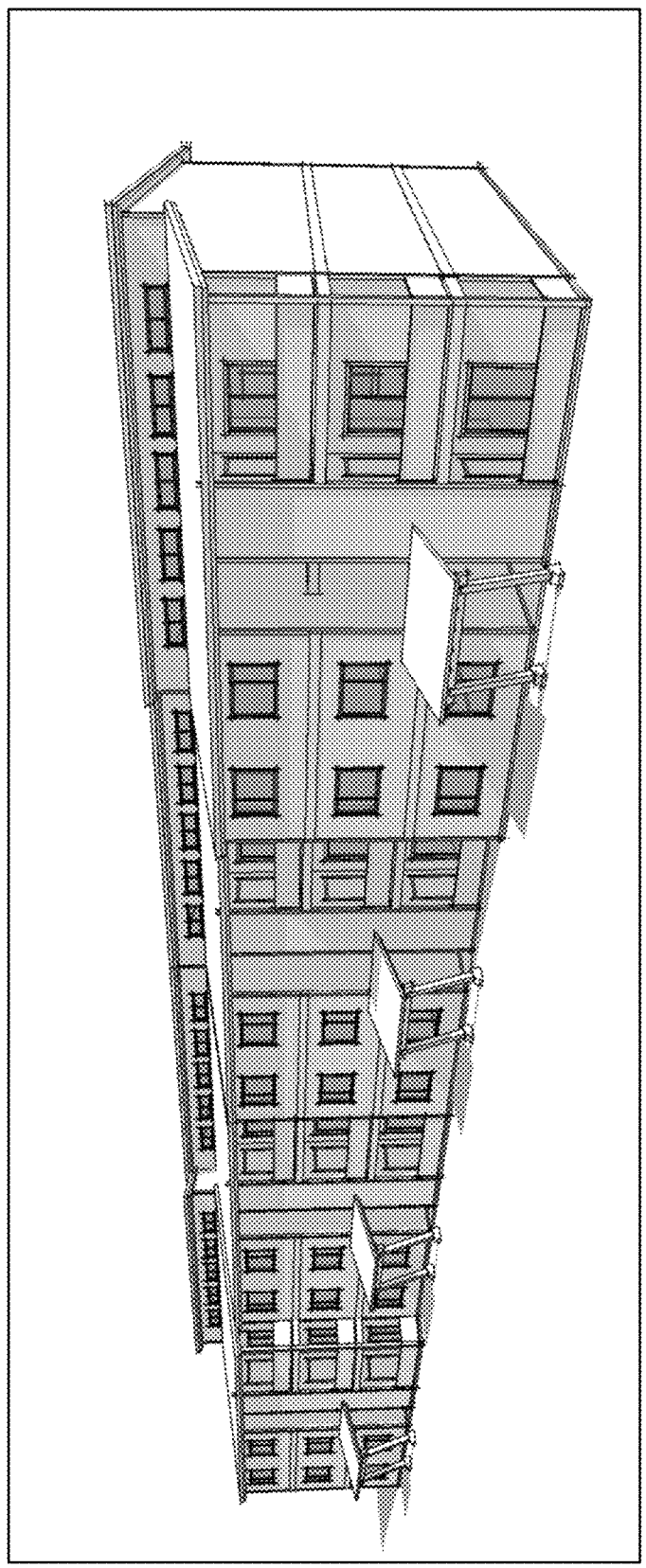
FIG. 8 illustrates an example building that may be manufactured using prefabricated building components based on municipal and county codes.

FIG. 8 illustrates an example building 800 that may be manufactured using prefabricated building components based on municipal and county codes. For example, the building 800 may be designed based on a limitation on a dimension of a housing feature as defined by a municipal or county housing code, e.g., the building 800 may be designed to comply with a maximum floor area or a footprint defined by the municipal or county housing code. The building 800 is illustrated as multiple attached units; however, the described systems and techniques apply equally well to detached units. It should be appreciated that the building 800 may be constructed entirely from prefabricated components or the building 800 can be constructed using no prefabricated components. Generally, the systems and techniques described are advantageous in examples where the building 800 is constructed from at least one prefabricated component. Examples of various types of structures that may benefit from the described systems and techniques include but are not limited to single family homes, duplexes, triplexes, quadplexes, townhomes, apartment buildings, office buildings, etc. Examples of types of prefabricated components that can be used to construct the building 800 using the described techniques include but are not limited to cross laminated timber panels, structural insulated panels, prefabricated walls, glulam beams, mass timber elements, mass plywood elements, engineered wood products, vertically laminated veneer elements, parallel strand lumber elements, plywood plates, veneer plywood elements, blockboard elements, laminboard elements, screws, nails, bolts, and connectors.

CONCLUSION

Although the implementation of prefabricated building components based on municipal and county codes has been described in language specific to structural features and/or methods, it is to be understood that the appended claims are not necessarily limited to the specific features or methods described. Rather, the specific features and methods are disclosed as example implementations of prefabricated building components based on municipal and county codes, and other equivalent features and methods are intended to be within the scope of the appended claims. Further, various different examples are described and it is to be appreciated that each described example can be implemented independently or in connection with one or more other described examples.

The invention claimed is:

1. A method for constructing a house, the method comprising:

identifying a housing design requirement from a housing code, the housing design requirement describing a maximum floor area and at least one feature that is excluded from a calculation of a floor area;

generating a housing design of the house configured to be manufactured using at least one prefabricated component, the housing design complying with the maximum floor area, wherein the housing design includes the at least one feature that is excluded from the calculation of the floor area;

refining the housing design by adjusting design dimensions based on stock dimensions of subcomponents of the at least one prefabricated component, the refining the housing design including:

determining a length of at least one subcomponent of the subcomponents extends from a start point of a design consideration of the housing design to a first cut point of a plurality of cut points of the design consideration, the plurality of cut points defining a plurality of use portions of the design consideration;

determining the length of the at least one subcomponent extends past a second cut point of the design consideration but does not fully extend to a third cut point of the design consideration;

comparing a portion of the at least one subcomponent that extends past the second cut point to the plurality of use portions;

determining the portion of the at least one subcomponent is not usable in any of the plurality of use portions based on the comparing;

determining a remaining distance from an end of the at least one subcomponent to the third cut point; and decreasing an adjustable distance of the design consideration by the remaining distance; and generating a refined housing design of the house based on the adjusting, the refined housing design including:
the at least one prefabricated component; and
a lower level of the house, the lower level having a storage space and no living space as defined by the housing code; and constructing the house using the refined housing design.

2. The method as described in claim 1, wherein the design dimensions include the stock dimensions of the subcomponents.

3. The method as described in claim 1, wherein the subcomponents include cross laminated timber panels.

4. The method as described in claim 1, wherein the subcomponents include structural insulated panels.

5. The method as described in claim 1, wherein the subcomponents include prefabricated walls.

6. The method as described in claim 1, wherein the housing code is a municipal housing code for cottage housing.

7. The method as described in claim 1, wherein the at least one feature is a bay window or a fireplace.

8. The method as described in claim 1, wherein the at least one feature is a utility closet or a stairway.

9. The method as described in claim 1, wherein the at least one feature is a storage area.

10. A method for constructing a house, the method comprising:

identifying a housing design requirement from a municipal housing code for cottage housing, the housing design requirement describing a maximum footprint and at least one feature that is excluded from a calculation of a footprint;

generating a housing design of the house configured to be manufactured using at least one prefabricated component, the housing design complying with the maximum footprint, wherein the housing design includes the at least one feature that is excluded from the calculation of the footprint;

refining the housing design by adjusting design dimensions based on stock dimensions of subcomponents of the at least one prefabricated component, the refining the housing design including:

determining a length of at least one subcomponent of the subcomponents extends from a start point of a design consideration of the housing design to a first cut point of a plurality of cut points of the design consideration, the plurality of cut points defining a plurality of use portions of the design consideration;

determining the length of the at least one subcomponent extends past a second cut point of the design consideration but does not fully extend to a third cut point of the design consideration;

comparing a portion of the at least one subcomponent that extends past the second cut point to the plurality of use portions;

determining the portion of the at least one subcomponent is not usable in any of the plurality of use portions based on the comparing;

determining a remaining distance from an end of the at least one subcomponent to the third cut point; and decreasing an adjustable distance of the design consideration by the remaining distance; and generating a refined housing design of the house based on the adjusting, the refined housing design including:
the at least one prefabricated component; and
a roof of the house, the roof of the house having a height as defined by the municipal code for cottage housing of 30 feet or less; and constructing the housing using the refined housing design.

11. The method as described in claim 10, wherein the at least one feature is a bay window or a utility closet.

12. The method as described in claim 10, wherein the at least one feature is a stairway or a fireplace.

13. The method as described in claim 10, wherein the at least one feature is a storage area.

14. The method as described in claim 10, wherein the design dimensions include the stock dimensions of the subcomponents.

15. The method as described in claim 14, wherein the subcomponents include cross laminated timber panels.

16. The method as described in claim 14, wherein the subcomponents include structural insulated panels.

17. The method as described in claim 14, wherein the subcomponents include prefabricated walls.

18. A method for constructing a house, the method comprising:

identifying a housing design requirement from a municipal housing code for cottage housing, the housing design requirement describing a maximum floor area and at least one feature that is excluded from a calculation of a floor area;

generating a housing design of the house configured to be manufactured using at least one prefabricated component, the housing design complying with the maximum floor area, wherein the housing design includes the at least one feature that is excluded from the calculation of the floor area;

refining the housing design by adjusting design dimensions based on stock dimensions of subcomponents of the at least one prefabricated component, the refining the housing design including:

determining a length of at least one subcomponent of the subcomponents extends from a start point of a design consideration of the housing design to a first cut point of a plurality of cut points of the design consideration, the plurality of cut points defining a plurality of use portions of the design consideration;

determining the length of the at least one subcomponent extends past a second cut point of the design consideration but does not fully extend to a third cut point of the design consideration;

comparing a portion of the at least one subcomponent that extends past the second cut point to the plurality of use portions;

determining the portion of the at least one subcomponent is not usable in any of the plurality of use portions based on the comparing;

determining a remaining distance from an end of the at least one subcomponent to the third cut point; and decreasing an adjustable distance of the design consideration by the remaining distance; and generating a refined housing design of the house based on the adjusting, the refined housing design including:

the at least one prefabricated component;

a lower level of the house, the lower level having a storage space and no living space as defined by the municipal code for cottage housing; and a roof of the house, the roof of the house having a height as defined by the municipal code for cottage housing of 30 feet or less; and constructing the house using the refined housing design.

19. The method as described in claim 18, wherein the at least one feature includes at least one of a bay window, a fireplace, a utility closet, a stairway, or a storage area.

20. The method as described in claim 18, wherein subcomponents include cross laminated timber panels.

* * * * *